United States Patent [19]

Losh

[11] 4,413,836
[45] Nov. 8, 1983

[54] TRACTOR-TRAILER COUPLING MEANS

[75] Inventor: Russell L. Losh, Rensselaer, Ind.

[73] Assignee: Talbert Manufacturing, Inc., Rensselaer, Ind.

[21] Appl. No.: 288,896

[22] Filed: Jul. 31, 1981

[51] Int. Cl.³ .............................................. B62D 53/06
[52] U.S. Cl. ................................ 280/423 B; 414/481
[58] Field of Search ....................... 280/423 B, 425 A; 414/481

[56] References Cited

U.S. PATENT DOCUMENTS

| | | | |
|---|---|---|---|
| 2,953,396 | 9/1960 | Meadows | 280/423 B |
| 3,027,030 | 3/1962 | Duffy | 280/423 B |
| 3,498,636 | 3/1970 | Jahn et al. | 414/481 X |
| 3,698,582 | 10/1972 | Weinmann | 280/425 A |
| 4,219,211 | 8/1980 | Sauers | 280/423 B |

FOREIGN PATENT DOCUMENTS

| | | | |
|---|---|---|---|
| 2035239 | 6/1980 | United Kingdom | 280/423 B |
| 1583861 | 2/1981 | United Kingdom | 280/423 B |

*Primary Examiner*—John A. Pekar
*Attorney, Agent, or Firm*—John R. Nesbitt

[57] ABSTRACT

An apparatus is disclosed for coupling a tractor to a trailer employing a detachable gooseneck type of connecting means, and has particular utility where loading and unloading is required without force binding of the mechanism. A trailer assembly is described that includes a trailer bed, a gooseneck having an end portion connected to the trailer bed, and a coupling mechanism having a tail member attached to the end portion of the gooseneck. The tail member is located centrally and rearwardly of the end portion of the gooseneck and defines an engaging bar. The rear section of the trailer bed is provided with ground-engaging wheels disposed thereon in supporting relationship, and the front section of the trailer bed has guide means thereat comprising side walls affixed to the guide means and sloping upwardly therefrom, with the guide means being complimentary to the tail member and engageable therewith. The guide means also includes an aperture disposed on the upper side of the front section, and latch means mounted internally of the trailer bed proximate the aperture. The latch means has a latching surface extendable through the aperture for attachment to the engaging bar, and an activator is provided for activating the latch means to couple the latching surface to the engaging bar.

6 Claims, 4 Drawing Figures

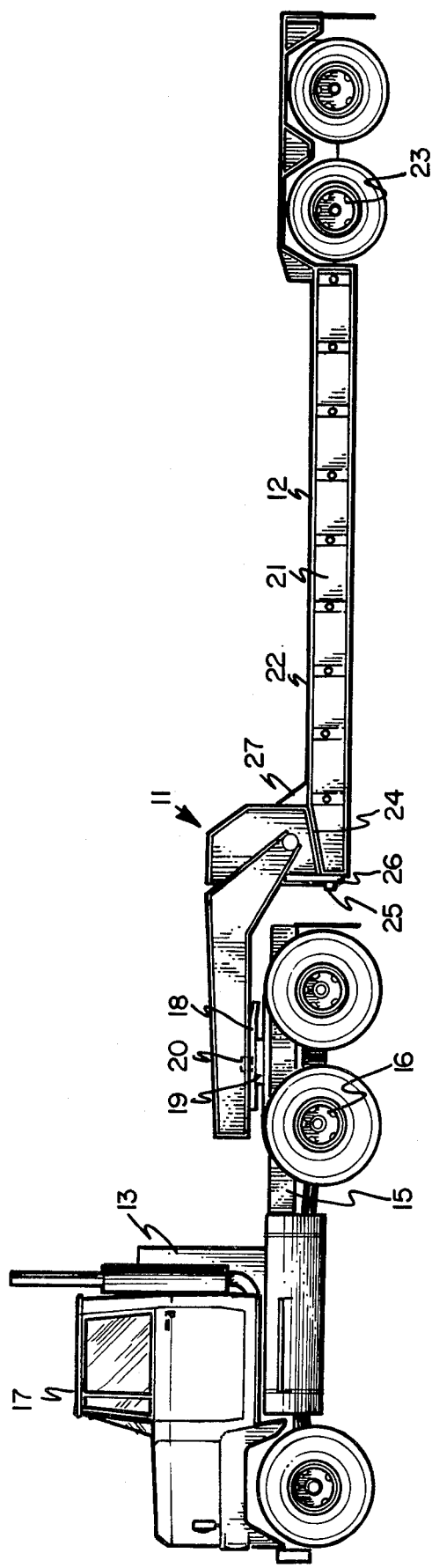
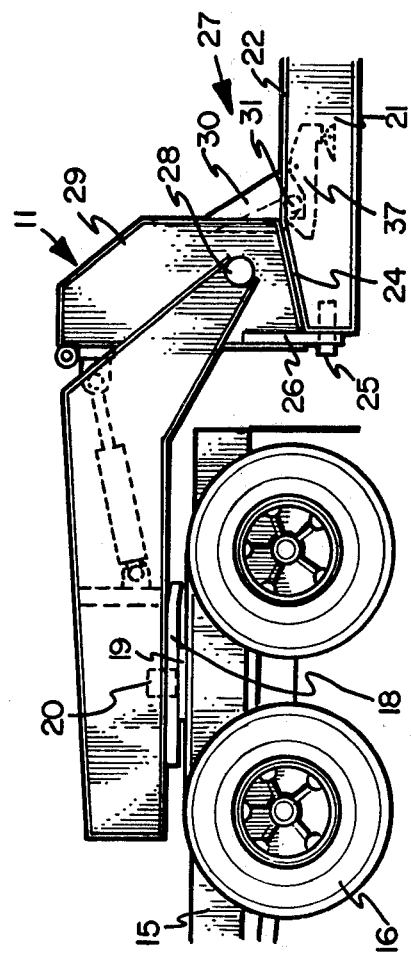

TRACTOR-TRAILER COUPLING MEANS

BACKGROUND OF THE INVENTION

A. Field of the Invention

This invention relates to improvements in coupling means used in tractor-trailer assemblies, and, more particularly, relates to locking mechanisms associated with hinged gooseneck devices in combination with load carrying trailer beds.

B. Description of the Prior Art

It is known that tractor and trailer assemblages are in common usage for hauling heavy articles upon low bed vehicles supported on rear wheels and carried at their forward end by gooseneck types of connecting devices. These assemblages are quite useful and are especially suited and convenient for front end loading and unloading of heavy items, including machinery, vehicles and the like.

In such tractor and trailer asemblages it is conventional to employ a coupling device between the front end of a low bed trailer and the rear end of the gooseneck device whereby the device may be, if desired, completely disconnected from the low bed trailer, while remaining connected to the tractor, so that the front end of the trailer, after being lowered into contact with the ground or a supporting surface, is free and unobstructed for loading and unloading.

Upon loading or unloading the low bed trailer, the tractor, along with the attached gooseneck, may be aligned with the front end of the low bed trailer and have the gooseneck coupled with the trailer. Various means have been employed in the art to improve the means for coupling the gooseneck to such low bed trailers. An especially useful assembly for coupling a tractor to a trailer is, by way of example, the Hinged Assembly Device set forth in U.S. Pat. No. 3,536,340 to Talbert. This patent describes a pivotally mounted base member which can be readily connected to a low bed trailer.

A number of locking devices have been utilized in connecting the base member to the front end of the trailer. Although such devices have met with various degrees of success there have been numerous problems associated therewith, including ease of operation and force binding of the connecting members.

Useful connecting devices are set forth in the patent literature. In particular, U.S. Pat. No. 2,952,476 to Brockman discloses coupling means employing cooperating stirrups and lugs and locking notches for engagement with the low bed trailer; U.S. Pat. No. 2,953,396 to Meadows describes a coupling device employing a locking arm and associated trailer pins that communicate with stirrup means; U.S. Pat. No. 2,967,720 to Smith et al discloses a pair of latching means for locking and securing a low bed vehicle; U.S. Pat. No. 3,027,030 to Duffy discloses a tractor-trailer draw bar coupling means employing pins and stirrups along with a movable draw bar king pin; U.S. Pat. No. 3,043,609 to Talbert discloses a removable gooseneck draw bar having an adjustable connection with a low-bed trailer, said trailer having several connecting means in the form of connecting pins and the like; U.S. Pat. No. 3,326,572 to Murray describes a detachable gooseneck trailer device employing engaging surfaces and pins for connecting the gooseneck and trailer; U.S. Pat. No. 3,866,947 discloses a removable gooseneck low boy trailer device employing a pair of upturned hooking means for interlocking with the front portion of the trailer; and, U.S. Pat. No. 4,219,211 to Sauers discloses a trailer connection means employing a hinged gooseneck portion having stirrups for engagement with pins affixed to the trailer and a downwardly retractable pin connected to the gooseneck for engagement with the trailer.

SUMMARY OF THE INVENTION

This invention provides a relatively simple, yet comprehensive coupling means for tractor-trailer assemblages. Moreover, this invention provides a useful connecting means which substantially reduces force binding associated with more complicated devices and is of a highly dependable construction, yet is more unitary in structure than assemblages of the type commonly utilized.

It is therefore an object of this invention to provide a safe and reliable connecting mechanism whereby coupling between the rear end of the gooseneck and the front end of a loaded or unloaded trailer may be easily and quickly effected by a single operator or attendant and which is registerable with any normal position of the front end of the trailer, which may be horizontal or inclined to a ground or support engaging position.

It is a further object of this invention to provide in a tractor-trailer coupling assemblage whereby the rear end of a gooseneck may be easily and readily connected together as well as taken apart from the front end of a low bed trailer.

It is still another object of this invention to provide a generally improved and readily detachable gooseneck tractor-trailer connecting mechanism.

It is yet another object of this invention to provide an improved tractor-trailer coupling device as described herein, which device is of simple construction, is adaptable to conventional gooseneck devices, especially hinged devices, is automatic in its operation, is safe to use, and is well adapted to the purposes described.

These together with other objects and advantages which will become subsequently apparent reside in the details of construction and operation as more fully hereinafter described.

BRIEF DESCRIPTION OF THE DRAWINGS

The accompanying drawings illustrate a complete embodiment of the invention according to the best mode so far devised for the practical application of the principles thereof and in which:

FIG. 1 is a side elevation view of a tractor and gooseneck unit with a hinged frame connecting assembly and a trailer unit of the low-bed type of this invention in the preferred transporting position;

FIG. 2 is a side view of a position of the trailer and tractor shown in FIG. 1 showing the invention in more detail;

DESCRIPTION OF THE INVENTION

Figure 3:
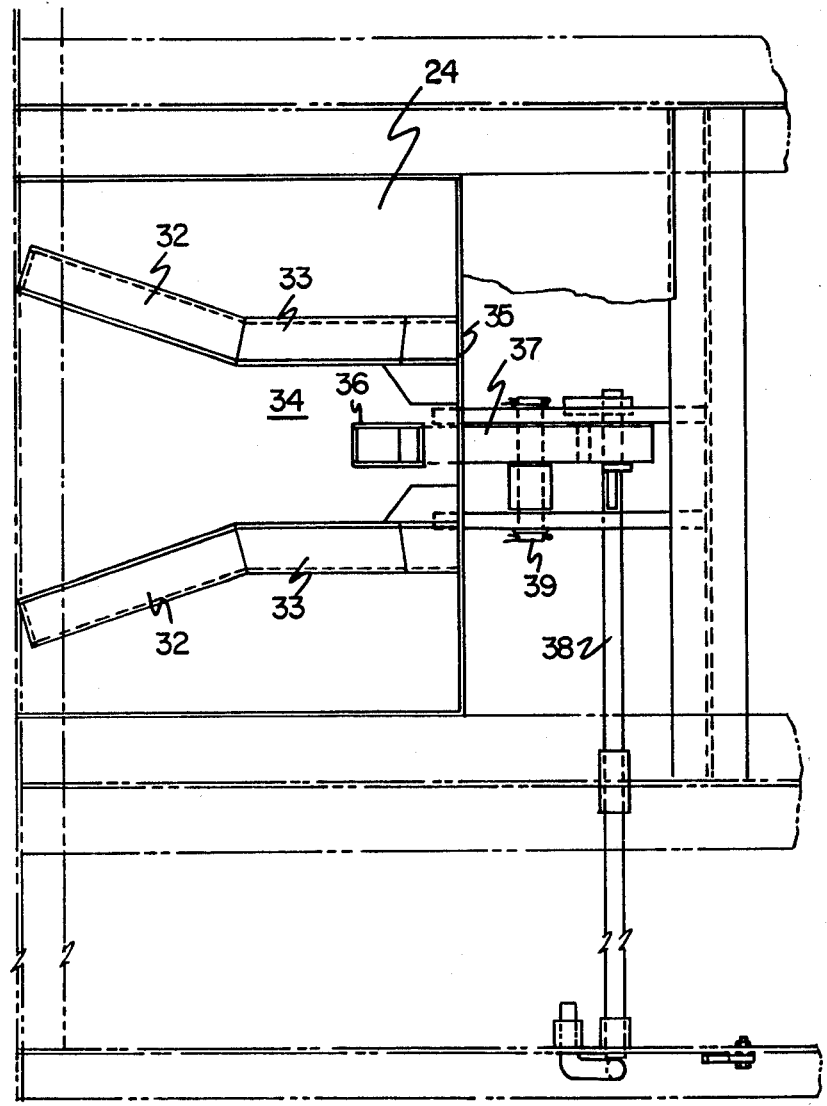
FIG. 3 is a partial top elevation view illustrating the connecting assembly of this invention.

Referring now to the drawings, and in particular to FIG. 1, the numeral 11 refers to a hinged frame assembly having the features of this invention utilized in connecting a low-bed type trailer 12 to a tractor 13. Tractor 13 may be conventional and includes a frame 15, wheels 16 and a cab 17. Frame 15 has a fifth wheel 18 supported on trunnions 19 rearwardly of the cab so that the fifth wheel can pivot about a horizontal axis extending transversely of the tractor, as is conventional. As is well known in the art, fifth wheel 18 has an opening (not shown) therein to receive a king pin 20 which is locked into position by a conventional locking mechanism (not shown).

Trailer 12 has an elongated low body 21 with a flat horizontal deck 22 and wheels 23 at the rear. The front section 24 of the deck of the trailer slopes forwardly and downwardly. Since heavy equipment is commonly loaded from the front of the trailer while the front engages the ground, this sloping portion is obviously advantageous for loading and unloading heavy equipment. In addition, a pair protruding pins 25 extend forwardly from the front of the trailer below the deck and engage a stirrup or aperture plate 26, while a tail member 27 connected to the hinged frame assembly is positioned over the upper side of the deck 22. Hinged frame assembly 11, which could be described as a hinged frame gooseneck, is described in greater detail in U.S. Pat. No. 3,536,340 to Talbert and is incorporated herein by reference.

As shown best in FIG. 2, base member 29, is pivoted by means of a pivot rod 28 so that the base member 29 will pivot about a horizontal axis. FIG. 2 shows tail member 27 a portion of which is cut away to show that it comprises two spaced apart metal plates 30 that are secured to base member 29 with a horizontal bar, or keeper, 31 being mounted between plates 30.

Figure 4:
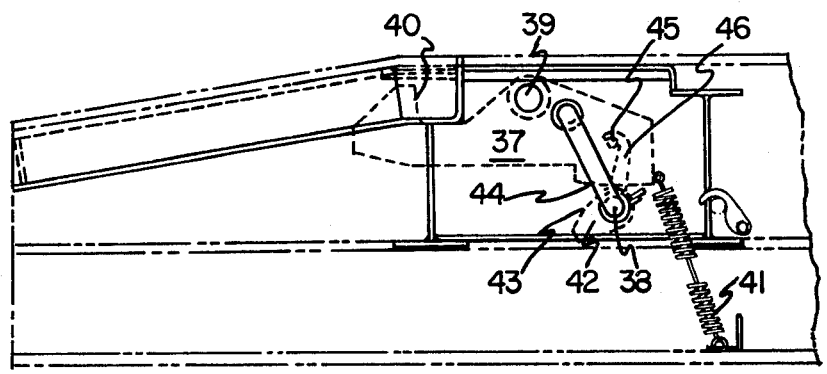
FIG. 4 is a partial side elevation view illustrating the connecting assembly of this invention.

As shown best in FIGS. 2, 3 and 4, the front section 24 of the deck is provided with guide walls 32 which converge upwardly and co-extend into upper side walls 33 that are spaced apart and substantially parallel to one another and terminate adjacent to a back wall 35 to define an enclosure or bin 34. The floor of bin 34 is provided with a large aperture 36. Secured to the front portion of body 21 of trailer 12 is a latching means, or swinging claw, indicated generally by reference numeral 37, and as shown most clearly in FIG. 4, is pivotally mounted to the body 21 of trailer 12 by means of a coupling rod 39. As shown in FIGS. 3 and 4, latching means 37 extends beneath and between upper side walls 33 and is adapted to swing and project a coupling surface 40 through aperture 36, with bias being provided by spring 41 to swing surface 40 of the latching means toward aperature 36. Swinging claw 37 is associated with a cam 42 which has a bearing surface 43, with the cam being situated beneath the swinging claw 37 and engageable therewith at its distal surface 44. Cam 42 is mounted to the body 21 of trailer 12 by rod member 38 which extends transversely of the deck 22. Also mounted to rod member 38 is hook 46 which swings and is engageable with a snap pin 45 intricately formed on swinging claw 37. FIG. 4 shows swinging claw 37 in a position such that coupling surface 40 can be in engagement with bar 31 of tail member 27.

As shown in FIG. 2, the bottom edge of base member 29 slopes downwardly and forwardly to match the slope of the front edge of the deck 22 whereby the tail member 27 is received between the converging side walls 33 and bin 34 whereby the keeper 31 is situated directly over aperture 36 for engagement with swinging claw 37.

In operation, the gooseneck attached to a tractor is positioned and aligned with the low bed trailer to be connected therewith. The tail member is moved into engagement along the sloping surface and up into position so that the keeper is directly over the aperture 36. At the same time, protruding pins 25 are received in stirrups 26. Cam 42 is actuated by rod 38 to release swinging claw 37 so that the claw engages and secures the gooseneck by locking into position keeper 31. To uncouple the device, cam 42 is actuated by rod 38 to lower the surface 40 of swinging claw so that the gooseneck may be disengaged from the low bed trailer by pulling forward with the tractor to disengage the tail member and at the same time with draw the retracting pins from the stirrups.

It is to be understood that while the foregoing description and drawings have presented a practical embodiment of the invention, various modifications may be made with respect to the specific structural componenets and arrangement, without departing from the spirit and scope of the invention as defined in the appended claims.

I claim that:

1. In a trailer assembly including a trailer bed and a gooseneck having a hinged end portion, apparatus coupling one end of the trailer bed to said hinged end portion, said apparatus comprising:

a tail member attached to hinged end portion, said tail member being located centrally and rearwardly of said end portion and defining an engaging bar;

the rear section of said trailer bed being provided with ground-engaging wheels disposed thereon in supporting relationship;

the front section of said trailer bed having guide means with side walls affixed thereto and sloping upwardly therefrom, said guide means being complementary to said tail member and engageable therewith, and said guide means including an aperture disposed on the underside of said front section;

latch means mounted internally of said trailer bed proximate said aperture, said latch means having a latching surface extendable through said aperture for attachment to said engaging bar; and means connected to said trailer bed for activating said latch means to couple said latching surface to said engaging bar.

2. The apparatus of claim 1 wherein said latch means further concludes a snap assembly comprising a swinging hook means, a transverse rod rotatbly mounted to said trailer bed and having attached thereto said hook means, and a retaining pin affixed to said latch means for engagement therewith whereby said snap assembly is in locking position concurrently with activation and engagement of said latch means.

3. In a tractor-trailer combination including a trailer having a body and wheel means supporting the rear end of the body, a tractor having an upwardly exposed fifth wheel assembly pivotally mounted thereon, and a gooseneck detachably connected at its higher portion to said fifth wheel assembly and at its lower portion to the front end of said body, a connecting means, comprising:

a tail member attached to said lower portion of said gooseneck, said tail member having two spaced apart depending sections and a bar secured therebetween;

guide means secured to the front of said body for receiving said tail member, said guide means sloping upwardly to said body, and said guide means including converging said walls secured to said section;

a latching area situated at the uppermost portion of said guide means, said latching area having restriction walls coextending from said converging side walls and a back wall secured therebetween, with said latching area having an apertured floor; and hook means pivotly mounted to said section, said hook means being provided with a locking surface adapted to swing upwardly through said apertured floor to engage said bar of said tail member.

4. A coupling assembly for connecting a tractor to a low-bed trailer, comprising:
- a gooseneck on said tractor projecting rearwardly therefrom and mounted thereon for vertical and lateral movements;
- a tail member attached to the rearward portion of said gooseneck, said tail member having secured thereto a bar;
- guide means secured to the front of said low-bed trailer for receiving said tail member, said guide means extending upwardly from the floor of said trailer, and said guide means including converging side walls secured to said trailer;
- a latching bin situated at the uppermost portion of said trailer, laid bin having restriction walls coextensive with said converging side walls, and a back wall secured therebetween, and said bin having an aperture in the base thereof; and
- hook means pivotally attached to said trailer and proximate said aperture, said hook means having a locking surface, means associated with an activating said hook, and means to urge said locking surface of said hook means upwardly to engage said bar of said tail member.

5. The coupling assembly of claim 4 wherein said assembly includes connector means extending from the front end of said trailer and adapted to be realeasably engageable with stirrup means connected to the rearward portion of said gooseneck.

6. In a trailer assembly including a trailer bed and a gooseneck having a hinged end portion, apparatus coupling one end of the trailer bed to said hinged end portion, said apparatus comprising;
- a tail member attached to said hinged end portion, said tail member being located centrally and rearwardly of said end portion, said tail member being comprised of a horizontal bar and tail plates spaced apart and secured to said hinged end portion with said tail plates extending outwardly from said hinged end portion ans retaining said horizontal bar therebetween;
- the rear section of said trailer bed having ground-engaging wheels disposed thereon in supporting relationship;
- the front section of said trailer bed having an aperture disposed on the underside thereof;
- latch means mounted internally of said trailer bed proximate said aperture, said latch means including a latching surface extendable through said aperture for attachment to said horizontal bar;
- and means connected to said trailer bed for activating said latch means to couple said latching surface to said tail member.

* * * * *